(12) United States Patent
Ling et al.

(10) Patent No.: US 11,143,901 B2
(45) Date of Patent: Oct. 12, 2021

(54) TEMPERATURE INDEPENDENT LCD POLARIZATION ROTATORS

(71) Applicant: National University of Singapore, Singapore (SG)

(72) Inventors: Euk Jin Alexander Ling, Singapore (SG); Rakhitha Chandrasekara, Singapore (SG); Kadir Durak, Singapore (SG)

(73) Assignee: National University of Singapore, Singapore (SG)

( * ) Notice: Subject to any disclaimer, the term of this patent is extended or adjusted under 35 U.S.C. 154(b) by 15 days.

(21) Appl. No.: 16/603,948

(22) PCT Filed: Apr. 10, 2018

(86) PCT No.: PCT/SG2018/050182
§ 371 (c)(1),
(2) Date: Oct. 9, 2019

(87) PCT Pub. No.: WO2018/190774
PCT Pub. Date: Oct. 18, 2018

(65) Prior Publication Data
US 2020/0124907 A1     Apr. 23, 2020

(30) Foreign Application Priority Data

Apr. 10, 2017 (SG) .............. 10201702947P

(51) Int. Cl.
*G02F 1/1333* (2006.01)
*G02F 1/01* (2006.01)
*G02F 1/133* (2006.01)
*G02F 1/1335* (2006.01)

(52) U.S. Cl.
CPC ...... *G02F 1/133382* (2013.01); *G02F 1/0136* (2013.01); *G02F 1/13306* (2013.01); *G02F 1/133528* (2013.01)

(58) Field of Classification Search
None
See application file for complete search history.

(56) References Cited

U.S. PATENT DOCUMENTS 4,390,874 A * 6/1983 Woodside ............ G09G 3/18
                                                            345/101
4,460,247 A    7/1984 Hilsum et al.
(Continued)

FOREIGN PATENT DOCUMENTS

CN    102967554 A    3/2013

OTHER PUBLICATIONS

International Search Report and Written Opinion for application No. PCT/SG2018/050182, dated Jul. 4, 2018 (10 pages).
(Continued)

*Primary Examiner* — James A Dudek
(74) *Attorney, Agent, or Firm* — Michael Best & Friedrich LLP

(57) ABSTRACT

A method and circuit for operating a liquid crystal device, LCD, based polarisation rotator. The method comprises the steps of tracking a capacitance value of the LCD rotator; and controlling a driver setting to the LCD rotator based on the tracked capacitance value to achieve temperature independent operation.

14 Claims, 9 Drawing Sheets

(56) References Cited

U.S. PATENT DOCUMENTS 5,247,378 A 9/1993 Miller
2007/0070501 A1 3/2007 Wen et al.

OTHER PUBLICATIONS

Macros C. et al, Temperature-Frequency Converter Using a Liquid Crystal Cell as a Sensing Element. Sensors, Mar. 7, 2012, vol. 12, pp. 3204-3214.
Chandrasekara R. et al., Tracking Capacitance of Liquid Crystal Devices to Improve Polarization Rotation Accuracy. Optics Express, Aug. 14, 2017, vol. 25, No. 17, pp. 20363-20368.

* cited by examiner

TEMPERATURE INDEPENDENT LCD POLARIZATION ROTATORS

FIELD OF INVENTION

The present invention relates broadly to temperature independent operation of liquid crystal device (LCD) based polarization rotators, and specifically to a method of operating a LCD based polarization rotator; to a driver circuit for an LCD rotator; and to a temperature independent operation of an LCD rotator, specifically without temperature stabilisation.

BACKGROUND

Any mention and/or discussion of prior art throughout the specification should not be considered, in any way, as an admission that this prior art is well known or forms part of common general knowledge in the field.

Liquid crystal devices with correctly configured quarter wave plates are widely used in rotating the polarization of light (herein referred to as "LCD rotators") by applying an electric field or voltage, and have multiple applications such as in optical displays. This ability to rotate polarized light using an electrical voltage input, make LCD rotators compact and useful instruments in precision optical engineering.

A large number of companies provide electrically controllable polarization rotators based on liquid crystals. LCD rotators rotate polarization of incoming light when their molecules are twisted under an applied electric field. This twist results in a unique capacitance for each setting of the polarization rotation, and occurs over a continuum. The ability of the molecules to twist under a fixed applied field, however, is highly dependent on temperature. At high temperatures, the molecules can twist for less applied field, and at lower temperatures, they require more voltage to twist. With sufficiently low temperature, the molecules can be frozen in place. This makes precision LCD rotators hard to use, and requires additional components such as temperature stabilizers.

Embodiments of the present invention provide seek to address at least one of the above problems.

SUMMARY

In accordance with a first aspect of the present invention there is provided a method of operating a liquid crystal device, LCD, based polarisation rotator, the method comprising the steps of tracking a capacitance value of the LCD rotator; and controlling a driver setting to the LCD rotator based on the tracked capacitance value to achieve temperature independent operation.

In accordance with a second aspect of the present invention there is provided a control circuit for a liquid crystal device, LCD, based polarisation rotator, comprising a sensing portion configured for tracking a capacitance value of the LCD rotator; and a control portion for controlling a driver setting to the LCD rotator based on the tracked capacitance value for the LCD rotator's temperature independent operation.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention provide a method and circuits for performing polarization rotation of an LCD rotator. Embodiments of the present invention can work over a wide range of temperatures, and advantageously enable precision LCD polarisation rotators without temperature stabilization.

Embodiments of the present invention tracks the capacitance of the LCD rotator for a given rotation angle. For each desired polarization rotation, there is a distinct capacitance due to the unique molecular twist of liquid crystals. A linear relationship can be provided—this allows a micro-controller to independently adjust the LCD rotator input setting based on the capacitance value, according to example embodiments. That is, embodiments of the present invention use capacitance to determine the polarization rotation imparted by the LCD rotator.

Advantageously, the LCD rotator can operate as a polarisation rotator while the modified RC relaxation oscillator circuit is tracking its capacitance, according to example embodiments. This is achieved by varying the modified RC relaxation oscillator circuit's charge—discharge wave induced on the LCD rotator, according to example embodiments. The change in polarisation rotation is achieved by adjusting the positive feedback in to the gain stage.

According to some embodiments, a duty-cycle approach can be implemented where the LCD rotator is operating in some part of a cycle, and being probed for its capacitance in the remaining cycle. Such embodiments can lead to lower performance in time and resource critical applications such as satellite based polarisation measurement experiments. Such an approach will be described below with reference to FIG. 6.

Figure 2:
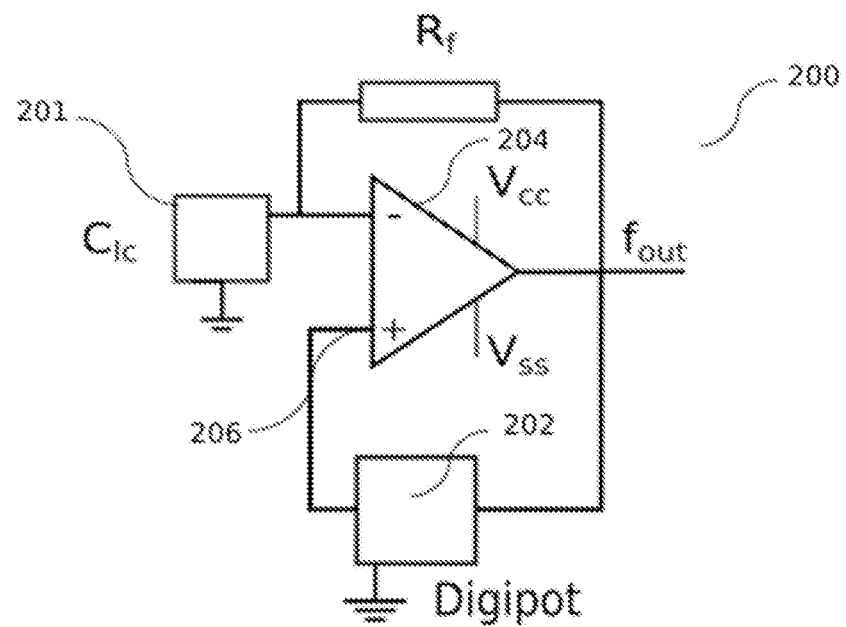
FIG. 2 shows an LCD rotator to be controlled by a resistor-capacitor (RC) relaxation oscillator circuit with its fixed positive feedback network (a fixed resistor ladder is used in a typical circuit) replaced by a digital potentiometer (Digipot) configured in voltage divider mode, according to an example embodiment. Here the LCD rotator (CO has replaced the typical capacitor used in the conventional RC relaxation oscillator circuit. The output frequency ($f_{out}$) of the RC relaxation oscillator is a function of $C_{lc}$.

In FIG. 2 an example implementation of how the capacitance of the LCD rotator 201 can be determined according to an example embodiments is shown. In this example, a circuit 200 referred to as a RC relaxation oscillator is used. It is important to note, however, that different circuits can be used in different embodiments. That is, the capacitance can be determined in a number of ways, and FIG. 2 is only one method for doing so, according to an example embodiment.

In FIG. 2, in a modified RC relaxation oscillator 200 (compared to a typical RC relaxation oscillator) with a digital potentiometer (Digipot) 202 configured to operate in voltage divider mode in the positive feedback network is provided, according to an example embodiment. With the Digipot 202, the positive feedback voltage at the operational amplifier's 204 positive terminal 206 can be adjusted at a 19.53 mV/bit resolution to change the peak-to-peak voltage amplitude of the charge-discharge wave induced on the LCD rotator 201. This allows the LCD rotator to be driven with an approximate triangular wave (charge-discharge wave) by adjusting the Digipot's 202 wiper position digitally.

The modified RC relaxation oscillator 200 outputs an oscillating frequency which is a function of the capacitance connected to the operational amplifier 204. Thus, by replacing the capacitance of the RC relaxation oscillator 200 with an LCD rotator 201, the LCD rotator's capacitance $C_{lc}$ can be determined from reading the oscillator frequency, $f_{out}$. Thus, the modified RC relaxation oscillator circuit can simultaneously drive and sense the capacitance of a LCD rotator.

Figure 3:
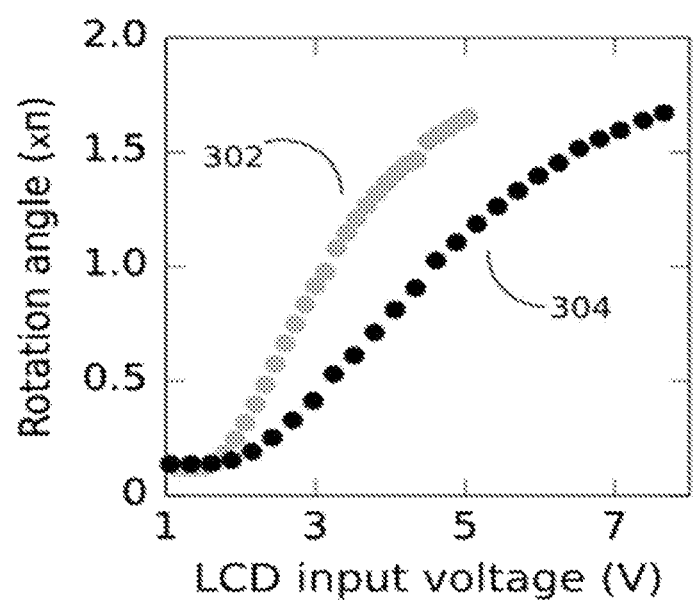
FIG. 3 shows the response curves obtained for an example embodiment of an LCD rotator with the modified RC relaxation oscillator circuit (curve 304) shown in FIG. 2 and with a standard square wave signal (curve 302). The similar level of rotation angles achieved by the LCD rotator according to the example embodiment at higher peak to peak input voltages illustrates the ability of using the proposed circuit in FIG. 2 as a driver.

FIG. 3 shows the response curves obtained for a LCD rotator when driven by a typical square wave driver (302) and by the modified RC relaxation oscillator (304). The ability to maintain the same rotation angle at higher peak to peak input voltages (compared to the standard method) illustrates the usefulness of the proposed circuit and the method to drive LCD rotators.

Figure 4:
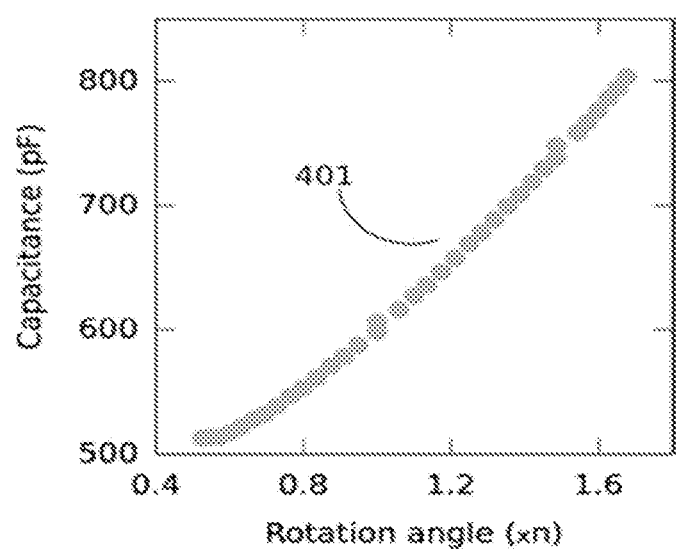
FIG. 4 shows the capacitance vs the rotation angle relationship obtained during the same experiment in which the FIG. 3 data was collected. The capacitance data was collected by monitoring the frequency output ($f_{out}$) of the modified RC relaxation oscillator while collecting the response data for FIG. 3.

FIG. 4 shows the relationship 401 between the LCD rotation angle and the capacitance when the LCD rotator was driven by a modified RC relaxation oscillator according to an example embodiment. From the curve 401, for a chosen rotation angle there exists a unique capacitance value. This value is used to derive the reference capacitances to be maintained by adjusting the driving voltage (using a proportional-integral-derivative loop to determine the Digipot's 202, FIG. 2, wiper setting) to the LCD rotator to achieve temperature compensation in this example embodiment.

Figure 5:
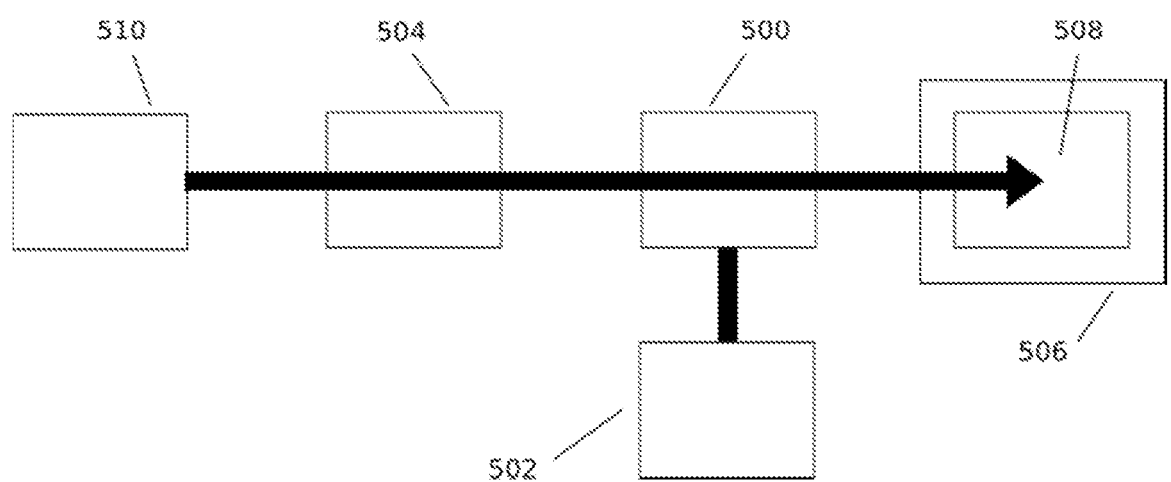
FIG. 5 shows the experimental set up used to obtain data for all the Figures, according to example embodiments. A reference laser beam was passed through a conventional polariser-analyser set up with a photodiode at the end to monitor the output optical power. The photodiode signal is converted back to the LCD rotation angle. An LCD rotator sitting on a thermo electric cooler was placed in between the polariser-analyser set up to control the polarisation of incoming light.

For testing, an LCD rotator 500 with the modified RC relaxation oscillator circuit functioning as a proportional-integral-derivative (PID) loop 502, according to an example embodiment, is placed in between a conventional polarizer 504 and analyzer 506 setup, as shown in FIG. 5. The LCD rotator 500 was placed on top of a thermo electric cooler (not shown) to adjust the temperature. The optical power transmission (using the laser 510) at different LCD rotation angles were recorded by the photodiode 508. The recorded optical power transmission values are converted back to LCD rotation angles using the Malus Law. For the experiment, five equally spaced LCD rotation angles at 22.2° C. (corresponding to some arbitrary chosen input voltage settings) were chosen to test the methodology and three of them are plotted in FIG. 7.

Figure 1:
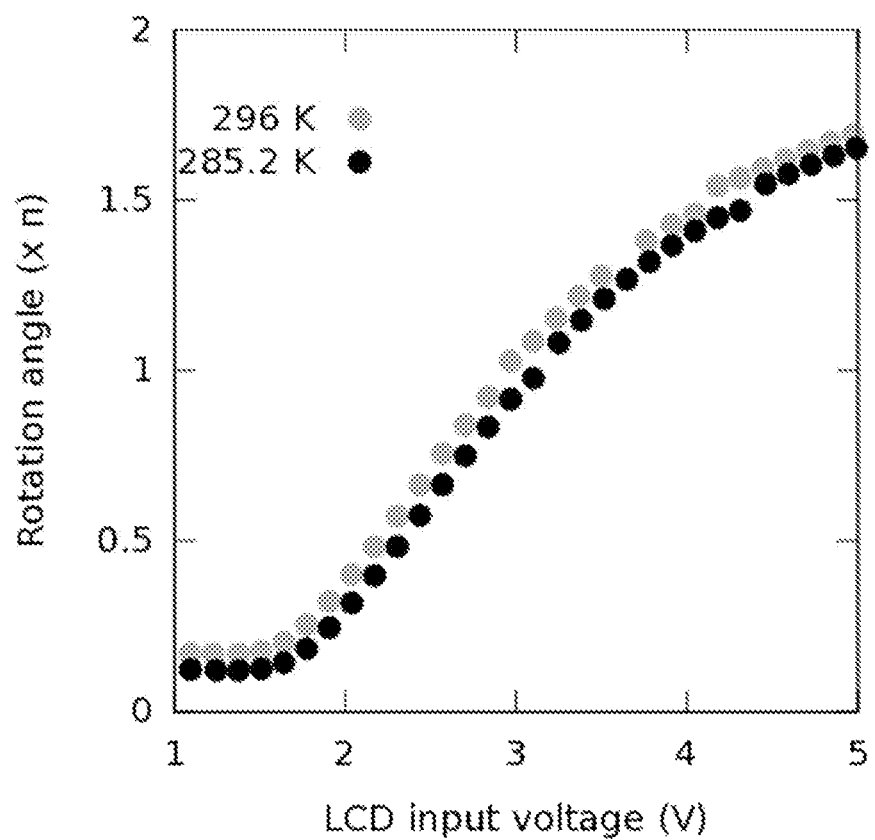
FIG. 1 shows a typical response of a LCD rotator at two different temperature settings when operated with a typical voltage driver circuit (square wave AC voltage operated at 3 kHz). The response curve is obtained by changing the amplitude of the square wave and the achieved rotation angle plotted against the peak to peak voltage value.
Figure 7:
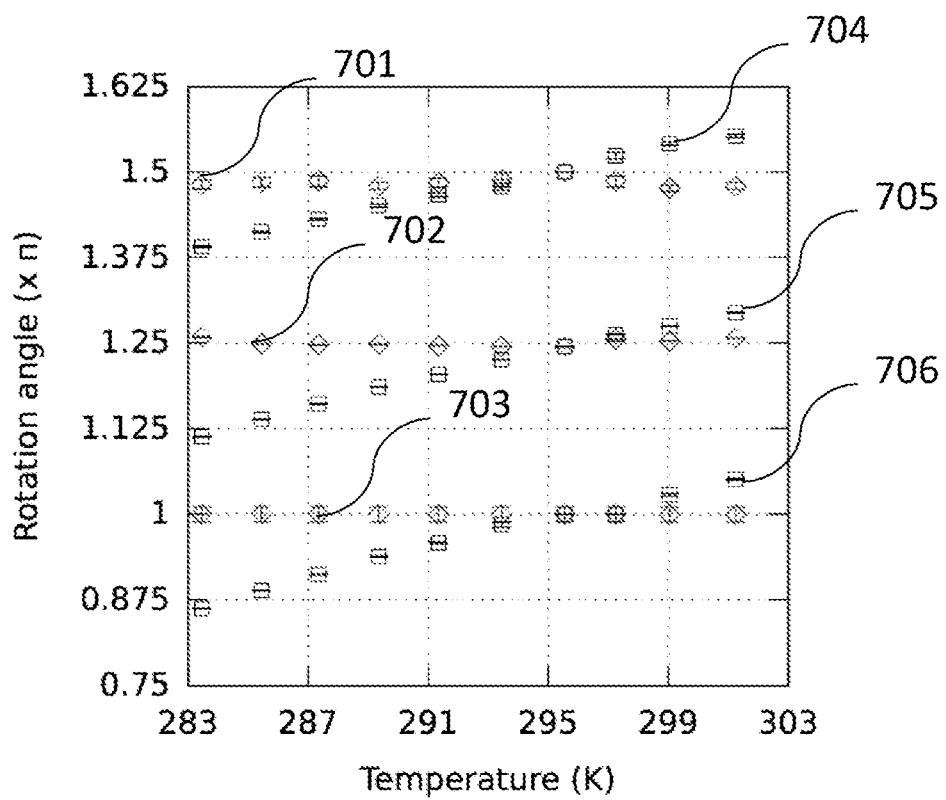
FIG. 7 shows comparative experimental data collected over a wide range of temperatures for three different rotation angles with the temperature compensation method according to example embodiments, using the modified RC relaxation oscillator circuit shown in FIG. 2.

The temperature is then swept over a wide range using the thermo electric cooler. For each temperature setting, with the PID loop 502 (FIG. 5) still de-activated, the LCD rotator's 500 (FIG. 5) input voltage is fixed at the values which correspond to rotation angles π, 1.25π and 1.5π at 22.2° C. (FIG. 7 data points at ~295.2 K). The resulting rotation angles are plotted as sets of data points 704, 705 and 706 in FIG. 7. The deviation of the rotation angles from the intended values (at 22.2° C.) at different temperature settings follow the trend described above with reference to FIG. 1.

Finally, for each rotation angle chosen at 22.2° C., the PID loop 502 (FIG. 5) according to an example embodiment is activated. It locks the LCD rotator's 500 (FIG. 5) capacitance to a reference capacitance value obtained from FIG. 4. The corresponding rotation angle at each temperature setting, when the PID loop 502 is working, are the sets of data points 701, 702, 703 in FIG. 7. It is possible to maintain the intended rotation angle according to an example embodiment, thus, indicating that the polarization is substantially fixed over the investigated temperature range via capacitance feed-back control of the voltage applied to the LCD rotator 500 (FIG. 5), according to the example embodiment tested.

Figure 6:
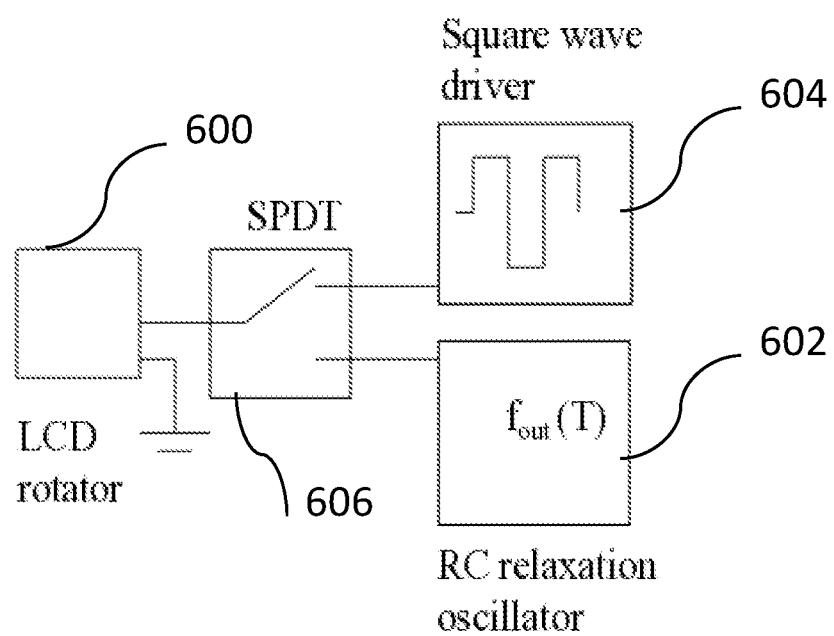
FIG. 6 shows an alternative approach according to an example embodiment where an LCD rotator can be operated in a duty cycle. The LCD rotator is connected to a typical driver circuit (square wave as the input) and a temperature sensing circuit (RC relaxation oscillator) via a single pole double throw (SPDT) switch. In this approach, the temperature of the LCD rotator is indirectly measured in a duty cycle by disconnecting it from the driver circuit and connecting it to the RC relaxation oscillator.

An alternative approach according to another example embodiment is shown in FIG. 6, where the LCD rotator 600 can be connected to a temperature sensing circuit 602 and a driver circuit 604 in a duty cycle approach via an electrically controllable SPDT switch 606. Here the temperature sensing circuit 604 is a RC relaxation oscillator with its positive feedback gain fixed at 0.5, according to an example embodiment, and the LCD rotator 602 is in place of the capacitor. Thus, the output frequency ($f_{out}$) of the RC relaxation oscillator circuit 602 is related to temperature. A calibration curve of temperature vs $f_{out}$ for a given rotation angle can be used to adjust the input voltage to the LCD rotator 600 to achieve temperature compensation. For example, a formula and/or a look-up table expressing a temperature dependence variable of the LCD rotator 600 can be used.

Figure 8:
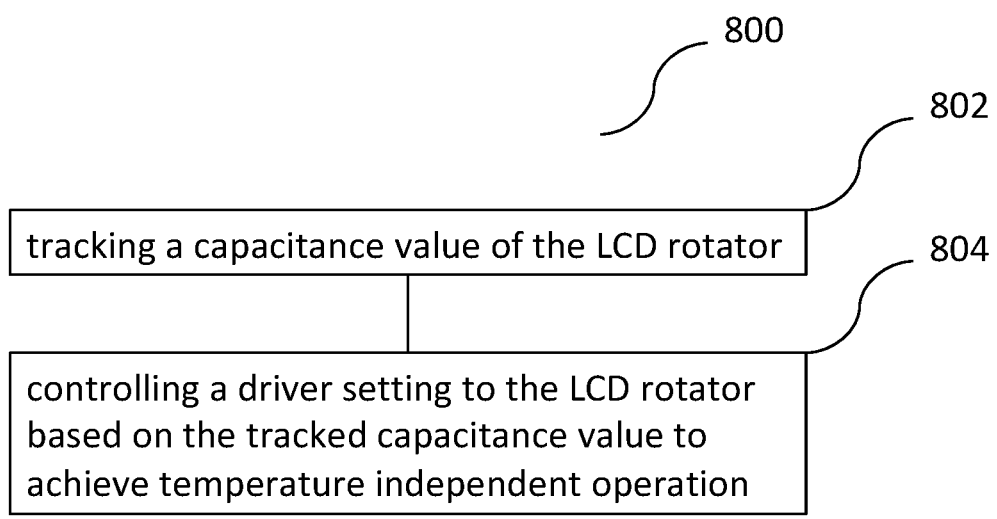
FIG. 8 shows a flowchart illustrating a method of operating an LCD based polarisation rotator according to an example embodiment.

FIG. 8 shows a flowchart 800 illustrating a method of operating a liquid crystal device, LCD, based polarisation rotator according to an example embodiment. At step 802, a capacitance value of the LCD rotator is tracked. At step 804, a driver setting to the LCD rotator is controlled based on the tracked capacitance value to achieve temperature independent operation.

The tracking of the capacitance may comprise measuring the capacitance using an RC relaxation oscillator circuit modified with a digital potentiometer, and the driver setting of the LCD rotator may be simultaneously controlled by driving the LCD rotator using a charge-discharge wave of the modified RC relaxation circuit. The method may comprise implementing a proportional-integral-derivative, PID, loop using the modified RC relaxation oscillator circuit. Controlling the driver setting may comprise using a tuned PID loop to lock to a reference capacitance.

The method may comprise probing the LCD rotator for tracking the capacitance in one part of a duty-cycle and operating the LCD rotator by controlling the driver setting during a remaining part of the duty cycle. Controlling the setting of the LCD rotator may comprise using a formula and/or a look-up table expressing a temperature dependence variable of the LCD rotator.

The driver setting may comprise an input voltage to the LCD rotator.

Figure 9:
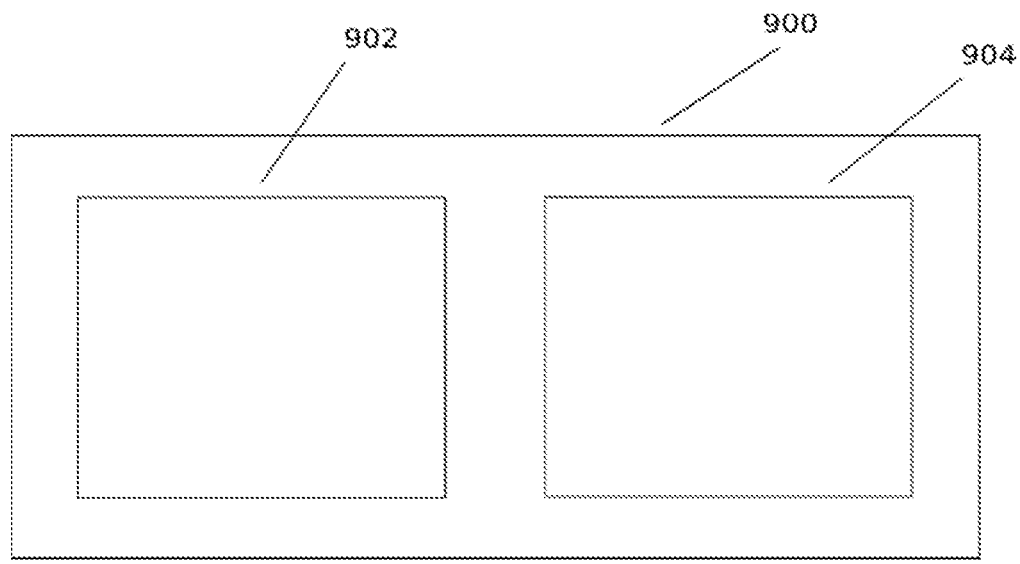
FIG. 9 shows a schematic drawing illustrating a control circuit for an LCD based polarisation rotator according to an example embodiment.

FIG. 9 shows a schematic drawing illustrating a control circuit 900 for a liquid crystal device, LCD, based polarisation rotator according to an example embodiment. The circuit 900 comprises a sensing portion 902 configured for tracking a capacitance value of the LCD rotator, and a control portion 904 for controlling a driver setting to the LCD rotator based on the tracked capacitance value for the LCD rotator's temperature independent operation.

The sensing portion 902 may comprise an RC relaxation oscillator circuit modified with a digital potentiometer, and the control portion 904 may be configured to simultaneously control the driver setting by driving the LCD rotator using a charge-discharge wave of the modified RC relaxation circuit. The sensing portion circuit may be implemented as a proportional-integral-derivative, PID, loop using the modified RC relaxation oscillator circuit. The control portion may be configured for controlling the driver setting using a tuned PID loop to lock to a reference capacitance.

The control circuit may be configured for probing the LCD rotator for tracking the capacitance in one part of a duty-cycle and operating the LCD rotator by controlling the driver setting during a remaining part of the duty cycle. The control portion may be configured for controlling the driver setting using a formula and/or a look-up table expressing a temperature dependence variable of the LCD rotator.

The driver setting may comprise an input voltage to the LCD rotator.

Figure 10:
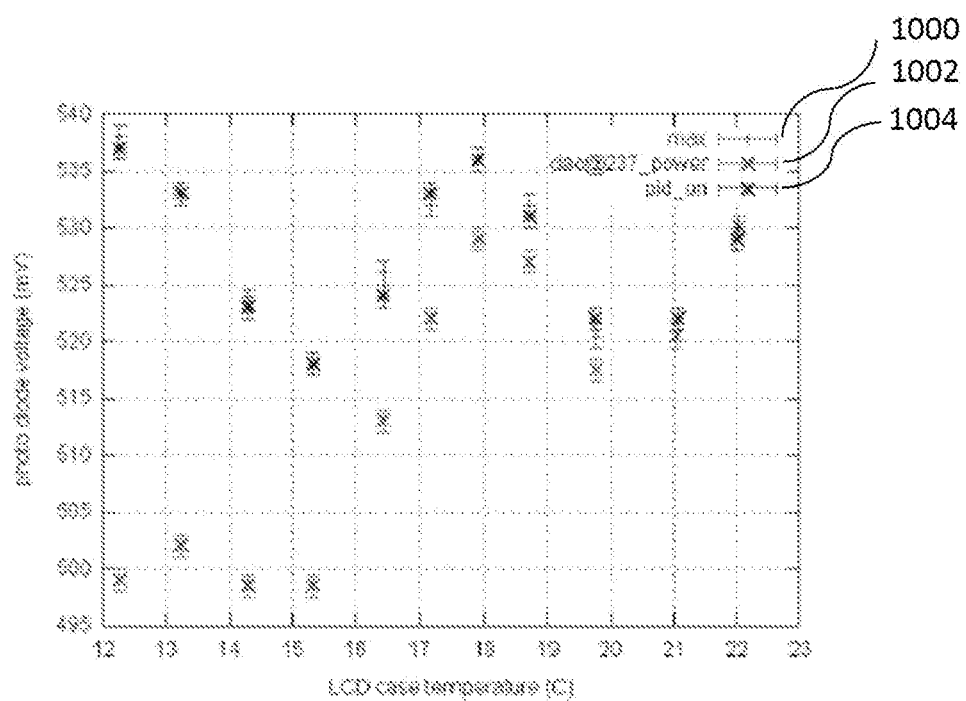
FIG. 10 shows comparative experimental data collected over a wide range of temperatures with the temperature compensation method according to example embodiments shown in FIG. 6. Here the data is plotted as a rotation angle and the data is presented in terms of optical power recorded by the photodiode.

In a different testing set-up, an LCD rotator with a relaxation oscillator circuit functioning as a capacitance sensor according to an example embodiment (compare FIG. 6) is placed in the experimental set up shown in FIG. 5. At 22° C., the capacitance value corresponding to a maximum optical power setting is recorded along with the corresponding voltage value at the photodiode. The temperature is then swept over a wide range. For each temperature setting, the LCD input voltage is swept to determine the maximum power setting which corresponds to a particular rotation angle. These are the data points 1000 shown in FIG. 10, and they show fluctuation (error bars) because the laser output has a poissonian distribution. The LCD rotator is then returned to 22° C., and its input voltage value is fixed to enable maximum power transmission. Keeping this voltage constant, the LCD rotator is then brought to the different temperature points, and the corresponding power values (data points 1002 in FIG. 10) are plotted. The drift in power (as a result of polarization rotation) is obvious in FIG. 10, i.e. compare points 1002 and 1000 at the same temperatures. Finally, the voltage applied to the LCD rotator is controlled using a formula and/or a look-up table expressing a temperature dependence variable of the LCD rotator to lock the polarization to that at 22° C. The corresponding optical power at each temperature setting are the points 1004. For all temperatures, it is possible to recover the maximum power according to an example embodiment, i.e. compare points 1004 and 1000 at the same temperatures, indicating that the polarization is substantially fixed over the investigated temperature range via control of the voltage applied to the LCD rotator, according to the example embodiment tested.

Example embodiments of the present invention have been shown to enable the LCD polarization rotation to be precisely determined by measuring its capacitance. This in turn enables any polarization rotation to be achieved by tracking the capacitance value. The benefit is that this allows precise operation of the LCD rotator under a wide range of temperatures according to example embodiments, without requiring external components to sense temperature and to stabilize it.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

We claim:

1. A method of operating a liquid crystal device (LCD) rotator, the method comprising the steps of:
   operating the LCD rotator in an operation state with a rotation angle corresponding to a reference capacitance of the LCD rotator;
   tracking a capacitance of the LCD rotator using an electrical connection to the LCD rotator; and
   controlling a driver setting to the LCD rotator to vary an operating voltage applied to the LCD rotator in the operation state using the same electrical connection to maintain the capacitance of the LCD rotator at the reference capacitance to achieve temperature independent operation.

2. The method of claim 1, wherein the tracking of the capacitance comprises measuring the capacitance using an modified RC relaxation oscillator circuit with a digital potentiometer, and the driver setting of the LCD rotator is simultaneously controlled by driving the LCD rotator using a charge-discharge wave of the modified RC relaxation circuit.

3. The method of claim 2, comprising implementing a proportional-integral-derivative, PID, loop using the modified RC relaxation oscillator circuit.

4. The method of claim 1, comprising probing the LCD rotator for tracking the capacitance in one part of a duty-cycle and operating the LCD rotator by controlling the driver setting during a remaining part of the duty cycle.

5. The method of claim 4, wherein controlling the driver setting of the LCD rotator comprises using a formula and/or a look-up table expressing a temperature dependence variable of the LCD rotator.

6. The method of claim 3, wherein controlling the driver setting comprises using a tuned PID loop to lock to a reference capacitance.

7. The method of claim 1, wherein the driver setting comprises an input voltage to the LCD rotator.

8. A control circuit for a liquid crystal device (LCD) rotator, comprising:
   a sensing portion configured for tracking a capacitance of the LCD rotator via an electrical connection to the LCD rotator with the LCD rotator in an operation state with a rotation angle corresponding to a reference capacitance; and
   a control portion for controlling a driver setting to the LCD rotator to vary an operating voltage applied to the LCD rotator in the operation state using the same electrical connection to maintain the tracked capacitance of the LCD rotator at the reference capacitance for the LCD rotator's temperature independent operation.

9. The control circuit of claim 8, wherein the sensing portion comprises an RC relaxation oscillator circuit modified with a digital potentiometer, and the control portion is configured to simultaneously control the driver setting by driving the LCD rotator using a charge-discharge wave of the modified RC relaxation circuit.

10. The control circuit of claim 9, wherein the sensing portion is implemented as a proportional-integral-derivative, PID, loop using the modified RC relaxation oscillator circuit.

11. The control circuit of claim 8, wherein the control circuit is configured for probing the LCD rotator for tracking the capacitance in one part of a duty-cycle and operating the LCD rotator by controlling the driver setting during a remaining part of the duty cycle.

12. The control circuit of claim 11, wherein the control portion is configured for controlling the driver setting using a formula and/or a look-up table expressing a temperature dependence variable of the LCD rotator.

13. The control circuit of claim 11, wherein the control portion is configured for controlling the driver setting using a tuned PID loop to lock to a reference capacitance.

14. The control circuit of claim 8, wherein the driver setting comprises an input voltage to the LCD rotator.

* * * * *